F. H. HOLTON.
VEHICLE TIRE.
APPLICATION FILED APR. 25, 1910.

1,000,000.

Patented Aug. 8, 1911.

ATTEST
E. M. Fisher
J. C. Mussun.

INVENTOR
FRANCIS H. HOLTON
BY Fisher &amp; Mussun
ATTYS.

UNITED STATES PATENT OFFICE.

FRANCIS H. HOLTON, OF AKRON, OHIO.

VEHICLE-TIRE.

1,000,000.          Specification of Letters Patent.      Patented Aug. 8, 1911.

Application filed April 25, 1910. Serial No. 557,336.

*To all whom it may concern:*

Be it known that I, FRANCIS H. HOLTON, citizen of the United States, residing at Akron, in the county of Summit and State of Ohio, have invented certain new and useful Improvements in Vehicle-Tires, of which the following is a specification.

My invention has reference to an improvement in vehicle tires adapted to take the place of the pneumatic tire now in common use.

To this end the invention consists in a tire which is provided with a specially constructed yielding member or part of a more or less cellular or equivalent formation and adapted to provide substantially the same kind and measure of resiliency that is obtained by the pneumatic tube and yet is proof against injury by puncture and very much more durable in service as well as being considerably less expensive in original cost, as will hereinafter fully appear.

Figure 1:
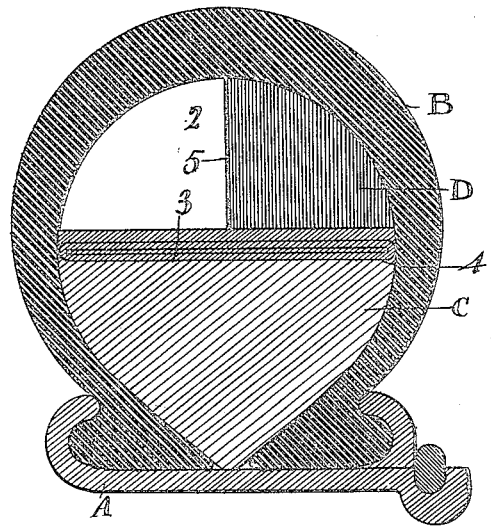
Figure 2:
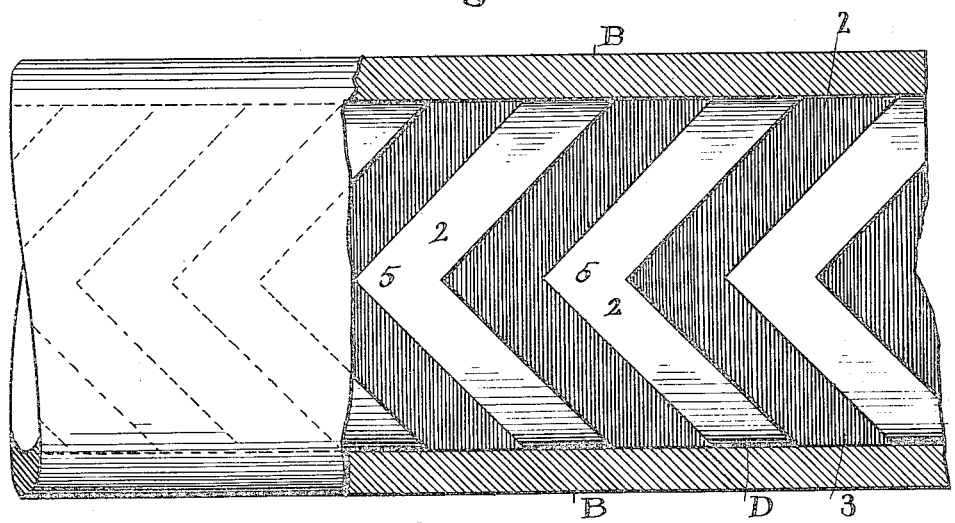
Figure 3:
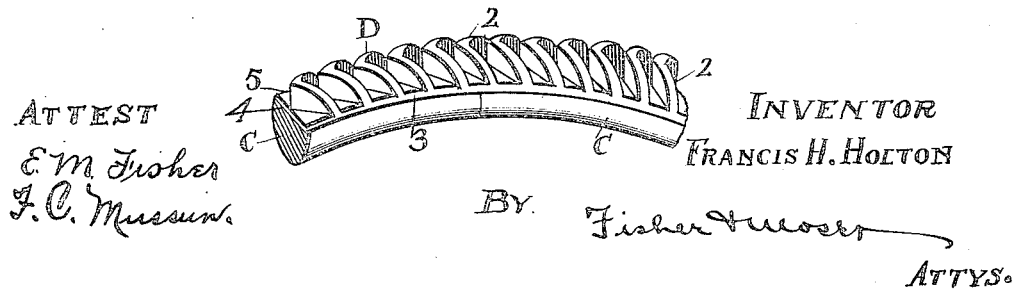

In the accompanying drawings, Figure 1 is a cross section of my new and improved tire, and Fig. 2 is a plan view of a portion thereof partially sectioned off at its periphery to disclose the internal construction. Fig. 3 is a perspective view of a segmental piece of the distinctively cushioning or yielding portion or part of the tire.

As thus shown the tire comprises four parts or portions consisting of the so-called clencher rim A, the outer tread tube or case B, the wooden or equivalent ring C and the resilient or cushioning member or portion D.

The rim A may be of any approved pattern or style but preferably is of a kind using a removable side portion or flange so as to facilitate the placing and removal of ring C, particularly when said ring is made of wood or like inelastic or inflexible material. If, however, said ring were constituted with more or less elasticity, say of a low grade of rubber or the like or were flexible so as to possibly be rolled over the last portion of the rim engaged thereby, a clencher rim having fixed side flanges might be used. Otherwise a removable side flange for said rim is deemed the better construction for a wooden or like ring. Structurally the said ring is approximately half round in cross section, conforming to its seat within the sides of rubber case B and, to be exact, assuming a more or less V shape in this instance. The said outer side of said ring is flat regardless of the material out of which it is constituted, so as to secure the yielding, spring or resilient member D thereon. This member in any event is constructed to fill out the other or outer half round space in cross section within case or tube B, and in this respect is complementary to ring C which occupies the other or inner half of said space. Said yielding member is both yielding and flexible. That is, it is constituted of a yielding or springy and flexible body comprised in the rubber strips or pieces 2, and a base 3 of heavy canvas or like material in one or more layers to which said strips are cemented and which in turn is adhered or cemented upon the flat outer surface 4 of said ring. This in practical effect constitutes the parts C and D into a single or unitary member of substantially cylindrical shape in cross section and filling out the space within case or tube B and sustaining the same relatively as seen in Fig. 1. The said rubber or equivalent strips or portions of member D are shown in this instance as of V shape in plan and projecting one within the other around the wheel in such relation that they have a certain space at all points between them even when compressed by a load, and that three or more of said strips will be involved in the tread when the load is upon them. The half round shape of the said pieces in face elevation of course brings their points 5 to the central position of greatest depth radially and where the weight will be heaviest, and said points might be strengthened if found necessary by incorporating more stock therewith, but I have found that this is not required since said points lie in respect to each other as they do and of course are made of a grade of rubber which, while it springs and is resilient in action has body enough to stand up and carry the load without breaking down.

Of course the present construction is not to be regarded as the only one within my invention, for in fact it is but one form of many which I have in mind, the generic idea being to have a cellular or honeycombed yielding part to substitute the pneumatic tire and which is supported on a solid or substantially solid ring forming the other or inner half of one complete member or part which fills out the usual outer case or tube B.

I have referred to the ring C as being a substantially solid portion, say of wood or the like, but by this I do not mean that it may not be made out of some other material or materials or of a composition which will probably include more or less yielding material like a low grade of rubber incorporated with more or less fiber, the object being to get a cheap and fairly firm base for the portion D.

By vehicle I mean to include bicycles, motor cycles and the like.

Ring C is not necessarily endless as it may be made in segments of a circle, and indeed if it be made of flexible material adapted to be bent circular it may even be made in one straight piece or a series of straight connected pieces.

What I claim is:

In vehicle tires, a tire having a core of relatively solid material substantially half round in cross section and provided with an outer portion adhered thereto and consisting of a series of flexible strips of substantially V shape in plan and of substantially half round shape in face elevation and overlapping successively at their sides, whereby several of said strips are brought into the immediate tread at the same time to carry the load.

In testimony whereof I affix my signature in presence of two witnesses.

FRANCIS H. HOLTON.

Witnesses:
   E. M. FISHER,
   H. T. FISHER.